July 26, 1938.

J. CHURCHWARD

Re. 20,808

ELECTRODE HOLDER

Original Filed Sept. 11, 1935

Inventor

Jack Churchward

By Rockwell & Bartholow

Attorneys

Reissued July 26, 1938

Re. 20,808

UNITED STATES PATENT OFFICE 20,808

ELECTRODE HOLDER

Jack Churchward, New Haven, Conn., assignor to The Churchward Engineering Company, Inc., New Haven, Conn., a corporation of Connecticut Original No. 2,059,438, November 3, 1936, Serial No. 40,047, September 11, 1935. Application for reissue May 23, 1938, Serial No. 209,537

9 Claims. (Cl. 219—8)

This invention relates to electrode holders and more particularly to an electrode holder for use in arc welding or the like in which the blade or jaw portions of the holder are detachable from the base or handle portion.

In my prior Patent No. 1,973,701 I have shown an electrode holder of a somewhat similar type in which the blade or jaw portions of the holder are provided upon their ends, which are attached to the handle, with half-round threaded portions designed to be screwed into a cylindrical internally threaded socket member. It has been found that in some instances when the holder is in use, the handle will become heated, due probably to the lack of a good tight contact between the socket and the threaded ends of the jaw members. It has been found that this heating can be prevented by so forming the handle members that there will be outward pressure upon the half-round portions at the rear end, tending to force the threaded surfaces of the handle members into close contact with the wall of the socket and thus provide a better electrical contact than can be obtained by the ordinary threaded engagement.

One object of the invention, therefore, is the provision of an electrode holder wherein the blades will be secured in tight contact with the base or handle member from which current is delivered to the blades.

Another object of the invention is the provision of an electrode holder such that the current-carrying member will be secured to the blades in a manner to prevent the generation of heat.

A still further object of the invention is the provision of an electrode holder having a pair of blades or jaws secured to a socket member, the blades being so formed at the socket connecting ends that they will be urged outwardly at all times into tight contact with the wall of the socket.

Still another object of the invention is the provision of an electrode holder having a pair of similarly formed jaws with half-round threaded surfaces upon their rear ends and an internally threaded socket to receive said half-round ends, and the blades being so formed that they diverge outwardly from the rear ends thereof, whereby the threaded ends are forced outwardly by the resiliency of the blades into tight contact with the wall of the socket.

To these and other ends, the invention consists in the novel features and combinations of parts to be hereinafter described and claimed.

To illustrate a preferred embodiment of my invention I have shown an electrode holder comprising a pair of blades or jaws 10 and 11 which are generally flat in shape for the greater part of their lengths but which are provided adjacent their rear ends with half-round portions 12 and 13 threaded externally. It will be understood that these half-round portions are complementary to each other, so that if placed together with their flat surfaces abutting they will form a substantially cylindrical externally threaded body.

The blades or jaws 10 and 11 are designed to receive and clamp an electrode therebetween and are preferably made of steel or some similar material in order that they may have a suitable amount of spring or resiliency between them so that they will clamp down upon the electrode after they have been spread apart and the electrode inserted.

Figure 1:
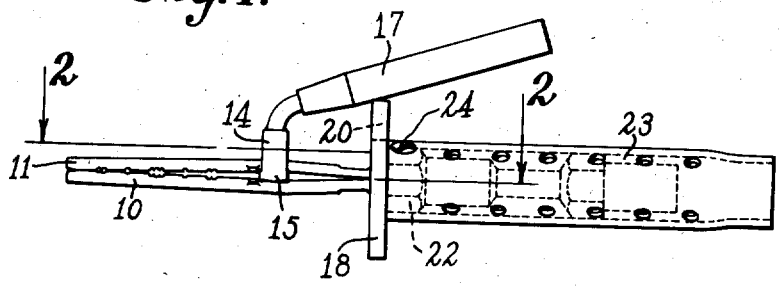
Fig. 1 is a side elevational view of an electrode holder embodying my improvements.
Figure 2:
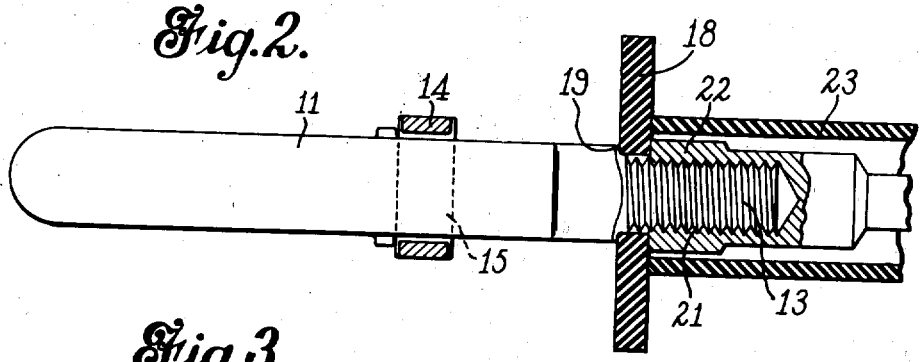
Fig. 2 is a sectional view on line 2—2 of Fig. 1.

This spreading may be readily accomplished by means of a stirrup or trigger member 14 having a portion 15 inserted between the jaws which may be recessed, as shown at 16, for this purpose, and the stirrup member 14 is provided with a rigidly attached operating member 17 designed to extend rearwardly over the handle of the tool, where it may conveniently be manipulated by the operator. It will be apparent that if the member 17 is moved downwardly from the position shown in Fig. 1, the blades will be spread apart by the part 15 and the electrode may then be inserted.

A guard 18 of insulating material may be slipped over the rear ends of the blade members to lodge against the shoulders 19 thereon, this guard being provided with a cut-out or recessed portion 20 within which the member 17 may be moved.

The half-round threaded portions 12 and 13 are received in an internally threaded socket 21 of a base or connector member 22, the latter being made of conducting material and designed to have a current lead conducted thereto in any suitable manner so that current will be connected from this lead to the jaws. A cylindrical guard or handle member 23 may be slipped over the connector member 22 and secured thereto by means of the screw 24. This guard may preferably be made of fiber or of other suitable insulating material so that the operator will be protected from the current passing through the member 22.

It has already been stated that the jaws 10 and 11 may be formed of steel or similar material and that these jaws possess a certain amount of inherent spring or resiliency, such as by tempering or the like, so that they tend to return to their normal positions when moved therefrom. It is particularly desirable in order to prevent the generation of heat in the socket 21 to provide a close, tight contact between the rear ends of the jaw member and the wall of the socket. This is accomplished in the present structure by the means which will now be described.

Figure 3:
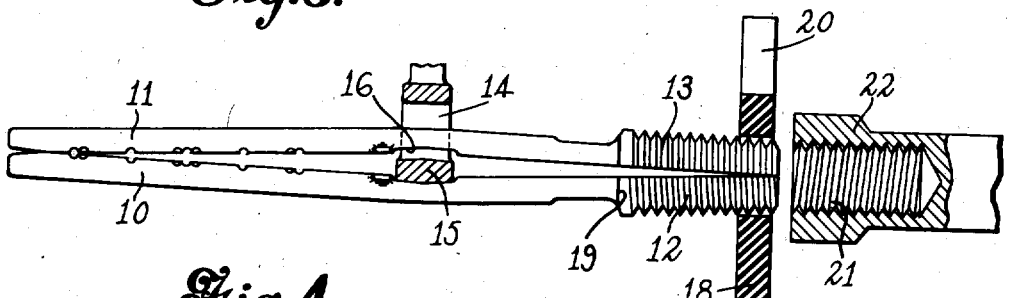
Fig. 3 is an enlarged view similar to Fig. 1 shown partly in section and showing the parts prior to the assembly thereof.

As originally made, the jaws, as shown in Fig. 3, are bowed outwardly to some extent adjacent their central portions so that, as shown in this figure, if they are placed in abutting relation at both ends, the central portions thereof adjacent the stirrup 14 will be spaced apart. The effect of this shaping of the jaws will be to cause the half-round threaded portions at the connected ends of the jaws to diverge or spread apart from their rear ends forwardly, so that while these threaded half-round portions together form a cylindrical portion at their extreme rear ends, as shown in Fig. 3, they are sprung apart so that the distance between the threaded surfaces at a distance from the ends is considerably greater in one direction than in the other. This, of course, is the condition existing prior to the insertion of the jaws within the socket 21.

When the socket 21 is screwed upon the jaws, it is screwed thereon with considerable effort, as by a wrench having a sufficiently long handle to give substantial leverage. This forces the diverging half-round portions together, as shown in Fig. 4, so that while it is necessary to use considerable force, nevertheless the socketed member 22 may be forced upon the threaded jaw bases 12 and 13 for substantially their entire length.

Figure 4:
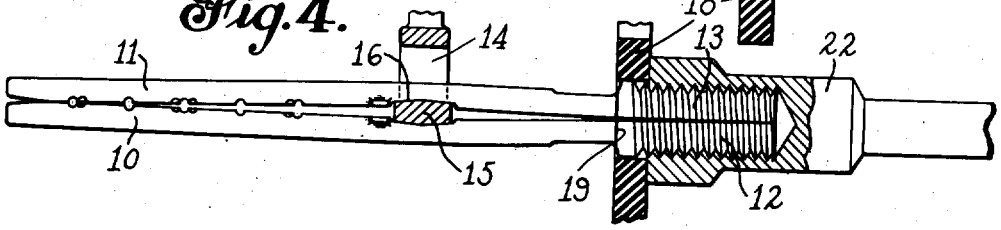
Fig. 4 is a view similar to Fig. 3 showing the parts in assembled relation.

When the tool has been assembled, as shown in Fig. 4, while the half-round threaded portions of the jaws will lie substantially flat upon each other, the blade portions of the jaws will still be bowed to some extent due to their initial shape and also due to the presence of the stirrup member 14 therebetween. The jaws will, however, be urged apart due to their inherent spring or resiliency and thus the half-round threaded portions will be forced into tight contact with the wall of the socket and will always be maintained in this position. This provides a good electrical contact between the threaded ends of the jaws and the socket member and effectually prevents the generation of heat at this point.

While I have shown and described a preferred embodiment of my invention, it will be understood that it is not to be limited to all of the details shown, but is capable of modification and variation within the spirit of the invention and within the scope of the appended claims.

What I claim is:

1. An electrode holder comprising a pair of substantially identical jaw members, each of said members having a relatively flat blade portion and a half-round threaded portion, said half-round threaded portions being disposed with their flat surfaces together whereby they form a split threaded plug, and a socket member having an internally threaded socket to receive said plug, said jaw members being inherently resilient and being bowed at their intermediate portions whereby said portions are in spaced relation when their ends are in contact, and the threaded surfaces taper toward the ends thereof so that when surfaces are received in said socket they will be urged into tight contact with the wall of the socket by the inherent resiliency of the jaw members.

2. An electrode holder comprising a pair of substantially identical jaw members having blade-like portions with complementary half-round threaded portions at the rear of said blade portions, a socket member having a threaded socket to receive said threaded portions, said jaw members being oppositely bowed at their central portions whereby such portions are spaced apart when their ends are in contact, and the flat sides of the half-round portions diverge from a point adjacent the ends of the jaws, and said socket member forcing said flat sides toward each other when the threaded portions of the blade members are received therein.

3. An electrode holder comprising a pair of jaw members, said members consisting of relatively flat blade portions in opposed relation and half-round complementary threaded portions at the rear ends of the blade portions, a socket member to receive the threaded portions of the jaws, and said jaws being so shaped as originally formed as to diverge from the rear ends of the threaded portions thereof and possessing inherent resiliency whereby when said threaded ends are forced into the socket, the surfaces thereof will be urged by the inherent resiliency into tight contact with the wall of the socket.

4. An electrode holder comprising a pair of jaws having blade-like portions with complementary threaded portions at their rear ends, said jaw members being inherently resilient and being so shaped as to be spaced apart at their central portions when their ends are in contact, an internally threaded socket member in which the threaded ends of the jaws are received, and said socket member forcing said ends together when the latter are received therein, whereby said ends are urged into tight contact with the wall of the socket by the inherent resiliency of the jaws.

5. An electrode holder comprising a conducting base member having a screw-threaded socket and a pair of electrode jaws having separate portions together forming a substantially cylindrical plug and threaded to be received in said socket, the threaded portion of said jaws being resilient, and the contacting surfaces of said portions diverging from the rear ends thereof, whereby the threaded surfaces will be forced into tight contact when received within the socket.

6. An electrode holder comprising a pair of electrode jaws each having a half-round threaded portion at one end, an internally threaded socket member to receive said portions, and said jaws being so formed that the abutting surfaces of said half-round portions diverge from the rear end thereof and being of resilient material whereby the threaded portions of the jaws will be forced into tight contact with the wall of the socket when the latter is forcibly threaded upon said portions.

7. An electrode holder comprising a pair of resilient jaw members having relatively flat opposing surfaces, said jaw members being bowed outwardly substantially from end to end whereby the intermediate portions thereof are spaced apart when their ends are in substantial contact, a trigger member disposed in the space between the jaws intermediate the ends thereof, and socket means receiving the rear ends of the jaws and forcing them together to hold the trigger in place and make tight contact with the socket.

8. An electrode holder comprising a pair of resilient jaw members having relatively flat opposing surfaces, socket means in which the rear portions of said jaw members are received, said members being of bowed form longitudinally whereby when superposed with their ends in contact one diverges from the other toward their intermediate portions, a trigger member extending between the jaw members at their spaced intermediate portions, and said socket means urging said members together to clamp the trigger therebetween and make tight contact between the socket and diverging portions of the jaw members.

9. An electrode holder comprising a pair of jaw members, a socket in which the rear portions of said jaw members are received, and a rocking stirrup member for separating said jaws, said jaw members being in the form of bows having their open portions facing each other whereby said stirrup member is readily received between them at a point intermediate of their ends and whereby the socketed portions of said jaws diverge from the rear ends thereof to be forced by their inherent resiliency into tight contact with the walls of the socket.

JACK CHURCHWARD.